US011945081B2

(12) United States Patent
Barbour

(10) Patent No.: US 11,945,081 B2
(45) Date of Patent: Apr. 2, 2024

(54) TOOL AND ASSOCIATED METHOD FOR TEMPORARY FASTENER PLACEMENT

(71) Applicant: Christopher Davis Barbour, High Point, NC (US)

(72) Inventor: Christopher Davis Barbour, High Point, NC (US)

( * ) Notice: Subject to any disclaimer, the term of this patent is extended or adjusted under 35 U.S.C. 154(b) by 66 days.

(21) Appl. No.: 17/742,102

(22) Filed: May 11, 2022

(65) Prior Publication Data

US 2022/0371164 A1 Nov. 24, 2022

Related U.S. Application Data

(60) Provisional application No. 63/191,742, filed on May 21, 2021.

(51) Int. Cl.
*B23P 19/00* (2006.01)
*B25B 31/00* (2006.01)

(52) U.S. Cl.
CPC .................................. *B25B 31/005* (2013.01)

(58) Field of Classification Search
CPC ......... B23P 11/00; B23P 11/005; B23P 19/00; B23P 19/04
See application file for complete search history.

(56) References Cited

U.S. PATENT DOCUMENTS

| | | | | |
|---|---|---|---|---|
| 6,196,779 | B1 * | 3/2001 | Falk | B25B 31/005 411/57.1 |
| 8,534,651 | B2 * | 9/2013 | Scapa | B25B 31/005 269/49 |
| 2016/0023334 | A1 * | 1/2016 | Rowe | F16D 3/405 29/244 |
| 2022/0371164 | A1 * | 11/2022 | Barbour | B25B 31/005 |

* cited by examiner

*Primary Examiner* — Lee D Wilson
(74) *Attorney, Agent, or Firm* — NK Patent Law

(57) ABSTRACT

A tool for use in installing and removing a cleco fastener. The tool includes a main body of the tool. The main body defines an elongated length. A grip pocket radially extends from the main body and is configured for receiving a shoulder extending from a cylindrical body of the cleco. A pusher surface is spaced-apart along the length of the main body from the grip pocket and also radially extends outwardly of the main body and configured for pushing a plunger extending from the cylinder body of the cleco. The pusher surface is configured for slidable movement along a portion of the length of main body. A handle is slidably received within the main body and coupled with the pusher surface to provide translation to the pusher surface to engage the plunger of the cleco to activate the cleco.

6 Claims, 4 Drawing Sheets

TOOL AND ASSOCIATED METHOD FOR TEMPORARY FASTENER PLACEMENT

This application claims priority to U.S. Provisional Patent Application No. 63/191,742 filed on May 21, 2021, the entire contents of which is incorporated by reference herein.

TECHNICAL FIELD

The presently disclosed subject matter relates to a tool for temporary fastener placement, typically used during fabrication of metal components.

BACKGROUND

In sheet metal fabrication and assembly, particularly in the area of aircraft manufacturing, it is frequently necessary for two metal parts to be temporarily joined together. Traditional cleco pliers (FIG. 1), similar to those found in U.S. Pat. Nos. 2,328,866 and 2,755,541, are used to install and remove temporary sheet metal fasteners, known as clecos (FIG. 2), similar to those in U.S. Pat. Nos. 2,136,875 and 8,534,651. Clecos are inserted in match drilled holes to temporarily hold two or more parts in place, so that riveting, drilling, sizing, cutting, fitting, filing, deburring, bending and other metal fabrication tasks may be accomplished with accuracy. The cleco is typically cylindrical in shape, and contains a plunger (3) at one end, with expandable prongs (4) on the opposing end, which are activated by an internal spring.

Traditional cleco pliers (FIG. 1), used to install and remove clecos, have changed very little since their introduction in the early 20$^{th}$ century. Traditional cleco pliers have opposing handles (8) at one end for the user's hand (17), and are attached by a pivot (9). At the opposite side of the pivot (9) there are jaws (10), which engage the cleco when the pliers' jaws (10) are squeezed together. The jaws of the cleco pliers are composed of a concave, integral or attached, piece (11) on one jaw (10) of the pliers, and a C shaped, integral or attached, piece (12) on the opposing jaw (10) of the pliers. The concave attachment (11) on one jaw (10) rests against the cleco plunger (3), and depresses it when the user squeezes the pliers. At the same time, a C-shaped attachment (12) on the opposing jaw (10), catches a ridge (5) which wraps around the circumference of the cleco body (2), providing an opposing force. This causes the cleco (FIG. 2) to activate.

While durable, and cheap to produce, traditional cleco pliers (FIG. 1) put the user's hand, wrist, and arm, at an awkward angle relative to the cleco and work surface. This awkward angle is uncomfortable and inefficient in power transfer. The traditional cleco pliers do not take advantage of the natural movement or angle of the hand, wrist, and arm. As a result, over the course of repeated uses, this awkward position can cause fatigue, pain, and undue stress to body parts and aggravate repetitive stress injuries such as carpal tunnel syndrome and various forms of arthritis. This is because of an improper handle axis angle (15).

Aside from being inefficient and uncomfortable, the traditional cleco pliers handle axis angle (15) also makes it very difficult to engage the cleco in a confined space. The traditional handle axis angle is close to horizontal, relative to the work surface (16). As a result, the cleco pliers protrude out across the workspace inconveniently when the pliers engage the cleco. This presents challenges when attempting to insert and remove clecos where multiple parts or other clecos are present nearby. Inserting clecos near the intersection of two or more parts, can be impossible.

Accordingly, it would be beneficial to provide an improvement that addresses the above-noted disadvantages.

DETAILED DESCRIPTION

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Figure 1:
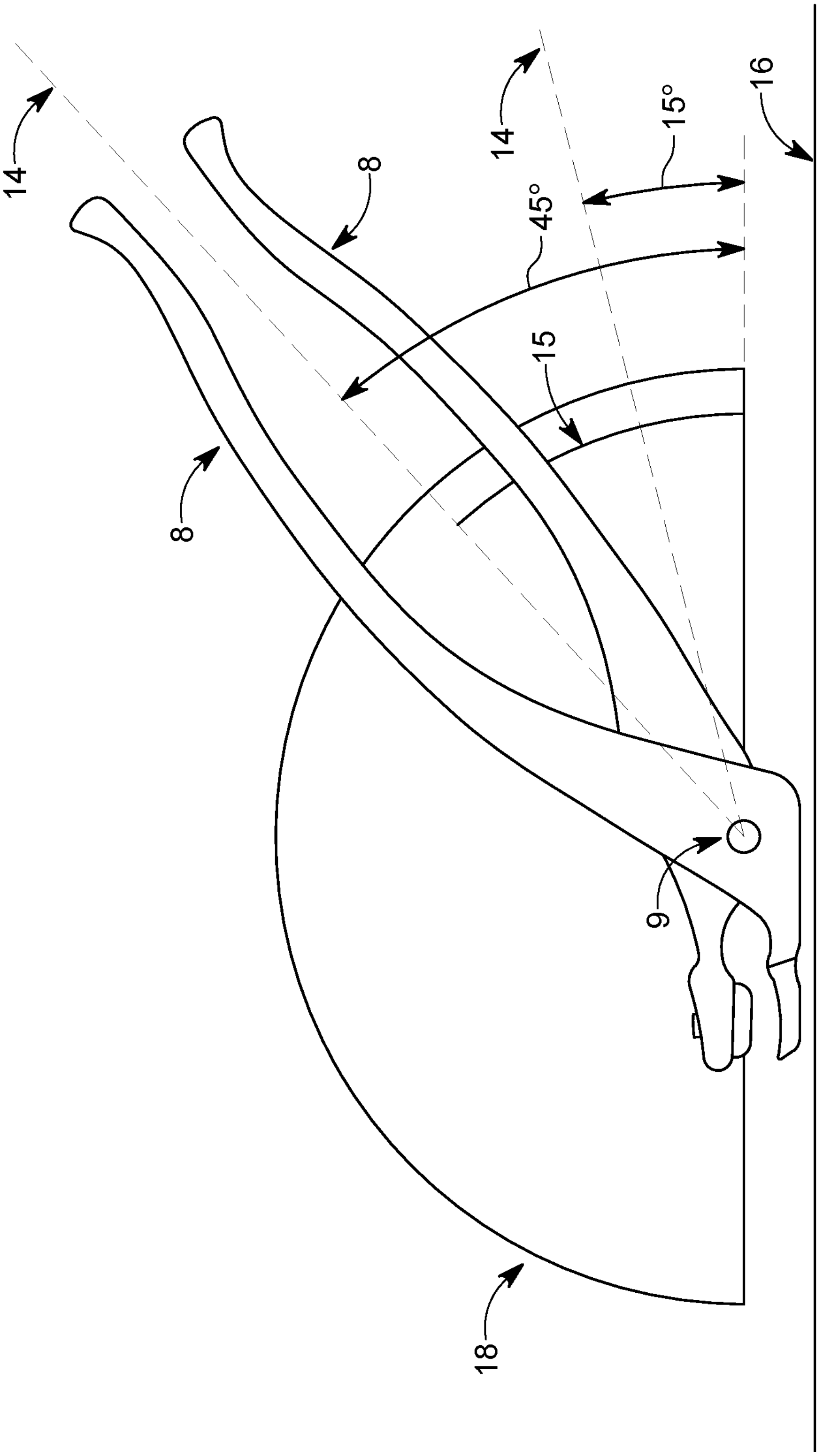
FIG. 1 is a side view of a traditional cleco tool.
Figure 2:
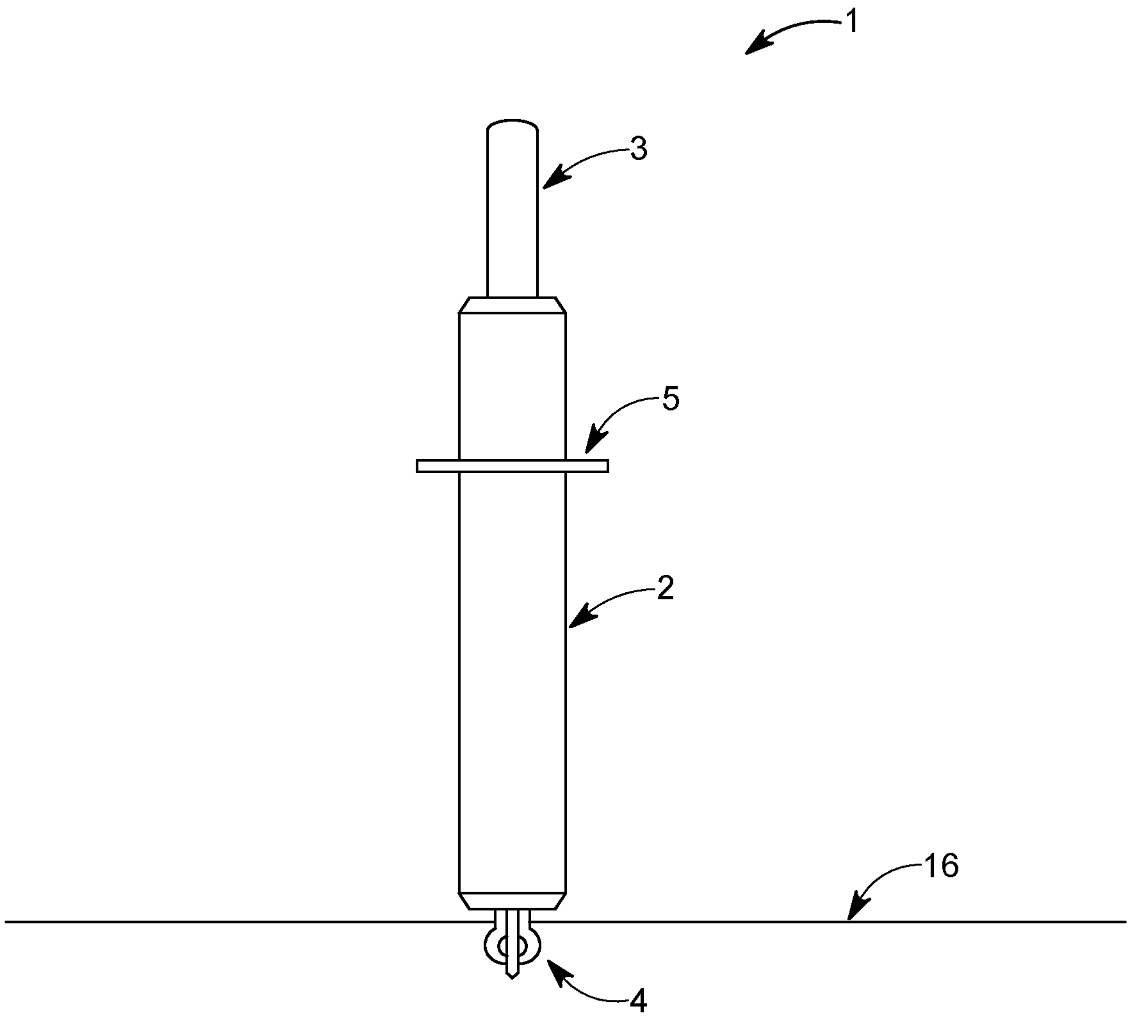
FIG. 2 is a side view of a cleco.
Figure 3:
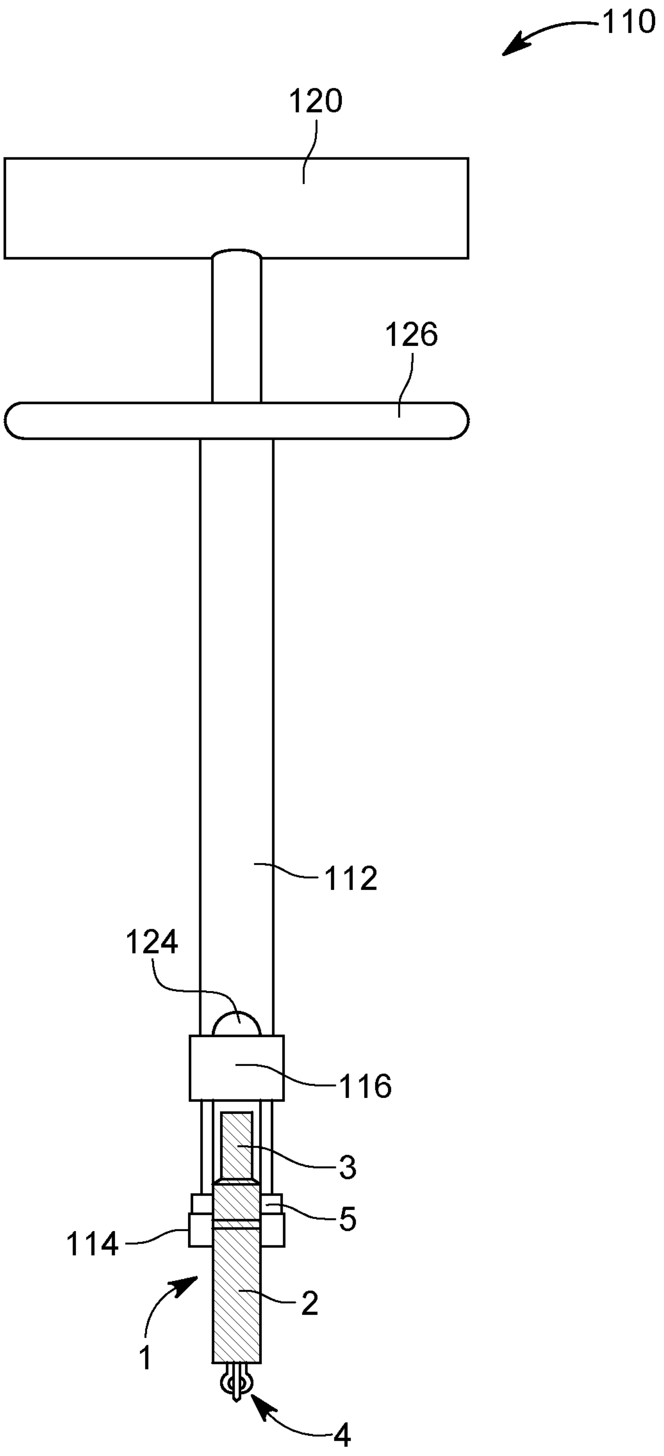
FIG. 3 is a front view of a tool for actuating a cleco according to one or more embodiments disclosed herein.
Figure 4:
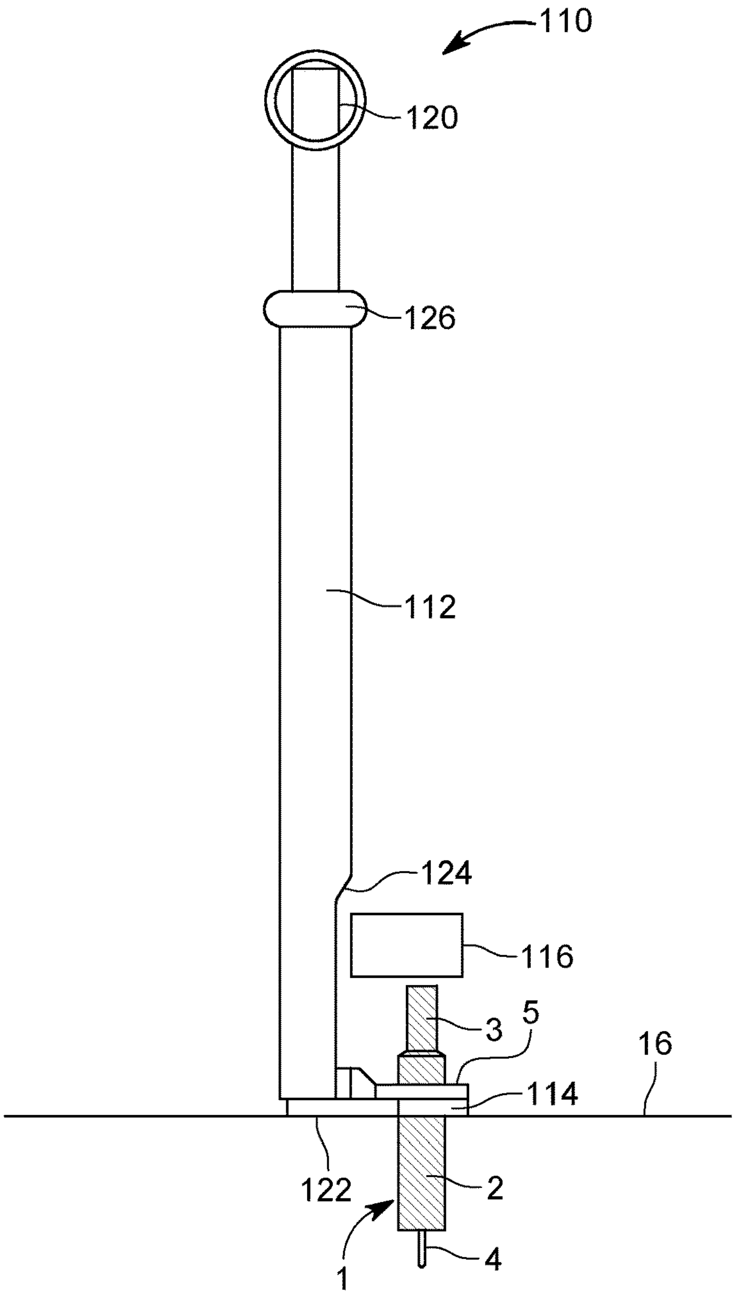
FIG. 4 is a side view of a tool for actuating a cleco according to one or more embodiments disclosed herein.
Figure 5:
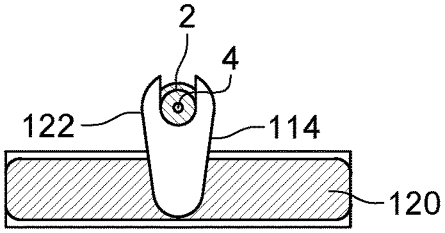
FIG. 5 is a bottom view of a tool for actuating a cleco according to one or more embodiments disclosed herein.

As illustrated in reference to FIGS. 3, 4, and 5, a tool for use in A tool for use in installing and removing a cleco fastener 1 is generally designated 110. The tool 110 includes a main body 112 of the tool. The main body 112 defines an elongated length. A grip pocket 114 radially extends from the main body 112 and is configured for receiving a shoulder/ridge 5 extending from a cylindrical body of the cleco 1. A pusher surface 116 is spaced-apart along the length of the main body 112 from the grip pocket 114 and also radially extends outwardly of the main body 112 and is configured for pushing a plunger 3 extending from the cylinder body 2 of the cleco 1. The pusher surface 116 is configured for slidable movement along a portion of the length of main body 112. A handle 120 is slidably received within the main body and coupled with the pusher surface 116 to provide translation to the pusher surface 116 to engage the plunger 3 of the cleco 1 to activate the cleco 1 as described in the background herein. The handle 120 is slideable in the same direction as a longitudinal extending through the length of the main body 112. In this manner, push-pull forces on the tool will activate the cleco. This is advantageous over the prior art designs as discussed since the tool can be used in tight and less accommodating spaces.

The grip pocket 114 is at a terminal end of the main body 112, and defines a flat bottom surface 122 for being rested against a working surface. This advantageously allows for the tool 110 to be positioned against the working surface 16 and provide stability to the tool, without utilizing excess working space. The main body 112 may define a recess 124 through which the pusher surface 112 extends from. The main body 112 may define a cross-bar 126 that extends in a horizontal direction that is parallel to a direction of the handle 120, such that a user may grip both the cross-bar 126 and the handle 120 to actuate the handle.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A tool for use in installing and removing a tool operated rivet fastener, the tool comprising:

a main body of the tool, wherein the main body defines an elongated length;

a grip pocket radially extending from the main body and configured for receiving a shoulder extending from a cylindrical body of the tool operated rivet fastener;

a pusher surface spaced-apart along the length of the main body from the grip pocket and also radially extending outwardly of the main body and configured for pushing a plunger extending from the cylinder body of the tool operated rivet fastener, wherein the pusher surface is configured for slidable movement along a portion of the length of main body;

a handle slidably received within the main body and coupled with the pusher surface to provide translation to the pusher surface to engage the plunger of the tool operated rivet fastener to activate the tool operated rivet fastener, wherein the handle is slideable in the same direction as a longitudinal extending through the length of the main body.

2. The tool according to claim 1, wherein the grip pocket is at a terminal end of the main body, wherein the grip pocket defines a flat bottom surface for being rested against a working surface.

3. The tool according to claim 1, wherein the main body defines a recess through which the pusher surface extends from.

4. The tool according to claim 1, wherein the main body defines a cross-bar that extends in a horizontal direction that is parallel to a direction of the handle, such that a user may grip both the cross-bar and the handle to actuate the handle.

5. A method of using the tool according to claim 1, further comprising positioning a tool operated rivet fastener, then actuating the handle to actuate the tool operated rivet fastener.

6. A tool for use in installing and removing a tool operated rivet fastener, the tool comprising:

a main body of the tool, wherein the main body defines an elongated length;

a grip pocket radially extending from the main body and configured for receiving a shoulder extending from a cylindrical body of the tool operated rivet fastener;

a pusher surface spaced-apart along the length of the main body from the grip pocket and also radially extending outwardly of the main body and configured for pushing a plunger extending from the cylinder body of the tool operated rivet fastener, wherein the pusher surface is configured for slidable movement along a portion of the length of main body;

a handle slidably received within the main body and coupled with the pusher surface to provide translation to the pusher surface to engage the plunger of the tool operated rivet fastener to activate the tool operated rivet fastener, wherein the main body defines a cross-bar that extends in a horizontal direction that is parallel to a direction of the handle, such that a user may grip both the cross-bar and the handle to actuate the handle.

* * * * *